United States Patent
Biskeborn et al.

(10) Patent No.: US 8,643,971 B1
(45) Date of Patent: Feb. 4, 2014

(54) METHODS UTILIZING SUPPLEMENTAL MODULE FOR BACKWARD AND/OR CROSS-PLATFORM COMPATIBILITY

(71) Applicant: International Business Machines Corporation, Armonk, NY (US)

(72) Inventors: Robert G. Biskeborn, Hollister, CA (US); Jason Liang, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/757,388

(22) Filed: Feb. 1, 2013

Related U.S. Application Data (63) Continuation of application No. 13/741,352, filed on Jan. 14, 2013.

(51) Int. Cl.
*G11B 5/008* (2006.01)
(52) U.S. Cl.
USPC .......................................................... 360/55
(58) Field of Classification Search
USPC .......................................................... 360/55
See application file for complete search history.

(56) References Cited

U.S. PATENT DOCUMENTS

| | | | |
|---|---|---|---|
| 5,867,339 A | 2/1999 | Panish et al. | |
| 6,643,086 B1 * | 11/2003 | Hiramoto et al. | 360/69 |
| 6,918,554 B2 * | 7/2005 | Stamm et al. | 242/338 |
| 8,395,860 B2 * | 3/2013 | Bui et al. | 360/77.12 |
| 2001/0055180 A1 | 12/2001 | Saliba | |
| 2007/0285838 A1 * | 12/2007 | Hennecken et al. | 360/129 |
| 2009/0219648 A1 | 9/2009 | Jaquette | |
| 2009/0231756 A1 | 9/2009 | Koeppe | |

FOREIGN PATENT DOCUMENTS

| | | |
|---|---|---|
| EP | 0 919 990 A2 | 6/1999 |
| WO | 2010/047679 A1 | 4/2010 |

OTHER PUBLICATIONS

Childers et al., "Six orders of magnitude in linear tape technology: The one-terabyte project," 2003 IBM, IBM Journal of Research and Development, vol. 47, No. 4, Jul. 2003, pp. 471-482.
Notice of Allowance and Fee(s) Due from U.S. Appl. No. 13/741,352 dated Oct. 17, 2013.

* cited by examiner

*Primary Examiner* — Mark Blouin
(74) *Attorney, Agent, or Firm* — Zilka-Kotab, PC (57) ABSTRACT

In one general embodiment, a method includes detecting a format in which data on a tape is written; using a module configured for writing and/or reading data to and from the tape in a first format when the format detected is the first format; and using a supplemental module coupled to the module for reading data from the tape in a second format when the format detected is the second format, wherein the first format has a higher data density than the second format. Additional products and processes are also presented.

5 Claims, 10 Drawing Sheets

METHODS UTILIZING SUPPLEMENTAL MODULE FOR BACKWARD AND/OR CROSS-PLATFORM COMPATIBILITY

RELATED APPLICATIONS

This application is a continuation of copending U.S. patent application Ser. No. 13/741,352, filed Jan. 14, 2013; which is herein incorporated by reference.

BACKGROUND

The present invention relates to data storage systems, and more particularly, this invention relates to utilizing magnetic tape heads having supplemental modules for backward and/or cross-platform compatibility.

In magnetic storage systems, data is read from and written onto magnetic recording media utilizing magnetic transducers. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, magnetic tape is moved over the surface of the tape head at high speed. Usually the tape head is designed to minimize the spacing between the head and the tape. The spacing between the magnetic head and the magnetic tape is crucial and so goals in these systems are to have the recording gaps of the transducers, which are the source of the magnetic recording flux in near contact with the tape to effect writing sharp transitions, and to have the read elements is in near contact with the tape to provide effective coupling of the magnetic field from the tape to the read elements.

BRIEF SUMMARY

A method according to one embodiment includes detecting a format in which data on a tape is written; using a module configured for writing and/or reading data to and from the tape in a first format when the format detected is the first format; and using a supplemental module coupled to the module for reading data from the tape in a second format when the format detected is the second format, wherein the first format has a higher data density than the second format.

A method according to another embodiment includes receiving designation of at least a first format and/or first generation for tape; and acquiring a magnetic head having: a module configured for writing and/or reading data to and from a tape in the first format and/or first generation; and a supplemental module coupled to the module, the supplemental module being configured for reading a tape having data written in the first format and/or first generation, and/or a second format and/or a second generation. The magnetic head is then sent to an entity.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

In one general embodiment, a magnetic head includes at least one first module configured for writing and/or reading data to and from a tape in a first format and/or first generation and writing data to the tape in a second format and/or second generation that is different than the first format and first generation; and a supplemental module coupled to the first module, the supplemental module being configured for reading a tape having data written in the second format and/or the second generation, wherein the data readers on the first module are wider in a cross-track direction than data readers on the supplemental module.

In another general embodiment, a magnetic head includes first modules configured for writing and read verifying data on a tape in accordance with a first generation and/or first format; and at least one supplemental module coupled to the first modules, the at least one supplemental module being configured for reading tape that was written by a head having modules configured for a different generation and/or different format than the first generation and/or first format, wherein readers of the supplemental modules additionally have at least one of a lower tape-to-sensor spacing, larger reader width, and a greater shield-to-shield spacing than readers of the first modules.

In one general embodiment, a method includes detecting a format in which data on a tape is written; using a module configured for writing and/or reading data to and from the tape in a first format when the format detected is the first format; and using a supplemental module coupled to the module for reading data from the tape in a second format when the format detected is the second format, wherein the first format has a higher data density than the second format.

In yet another general embodiment, a method includes receiving designation of at least a first format and/or first generation for tape; and acquiring a magnetic head having: a module configured for writing and/or reading data to and from a tape in the first format and/or first generation; and a supplemental module coupled to the module, the supplemental module being configured for reading a tape having data written in the first format and/or first generation, and/or a second format and/or a second generation. The magnetic head is then sent to an entity.

Figure 1A:
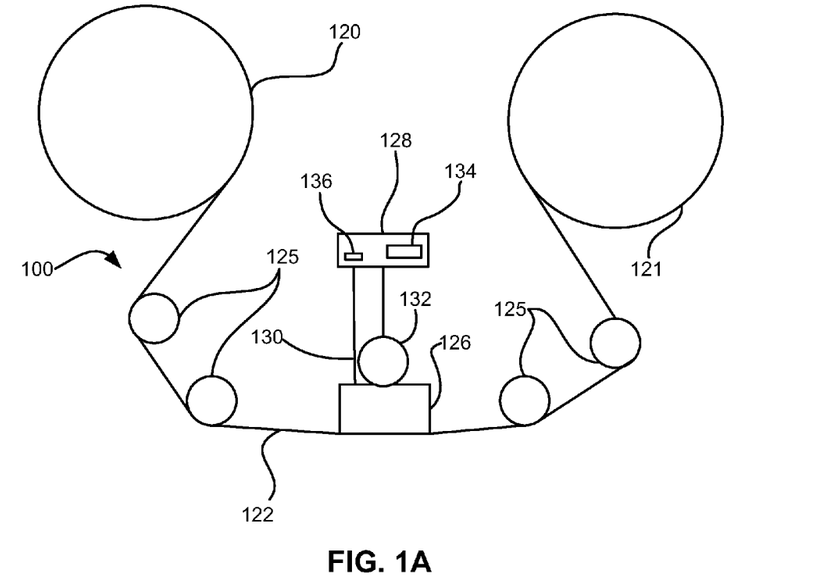
FIG. 1A is a schematic diagram of a simplified tape drive system according to one embodiment.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may operate under logic known in the art, as well as any logic disclosed herein. The controller 128 may be coupled to a memory 136 of any known type, which may store instructions executable by the controller 128. Moreover, the controller 128 may be configured and/or programmable to perform or control some or all of the methodology presented herein. Thus, the controller may be considered configured to perform various operations by way of logic programmed into a chip; software, firmware, or other instructions being available to a processor; etc. and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (integral or external) to send and receive the data and for controlling the operation of the tape drive 100 and communicating the status of the tape drive 100 to the host, all as will be understood by those of skill in the art.

Figure 1B:
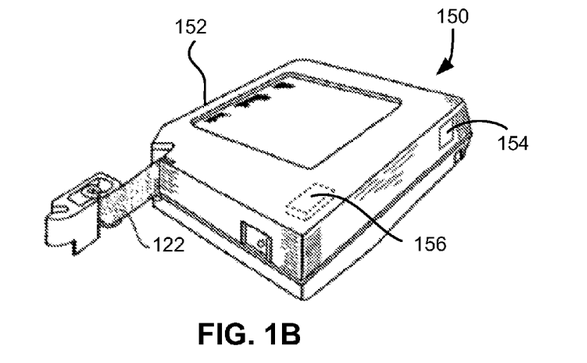
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or other device.

Figure 2:
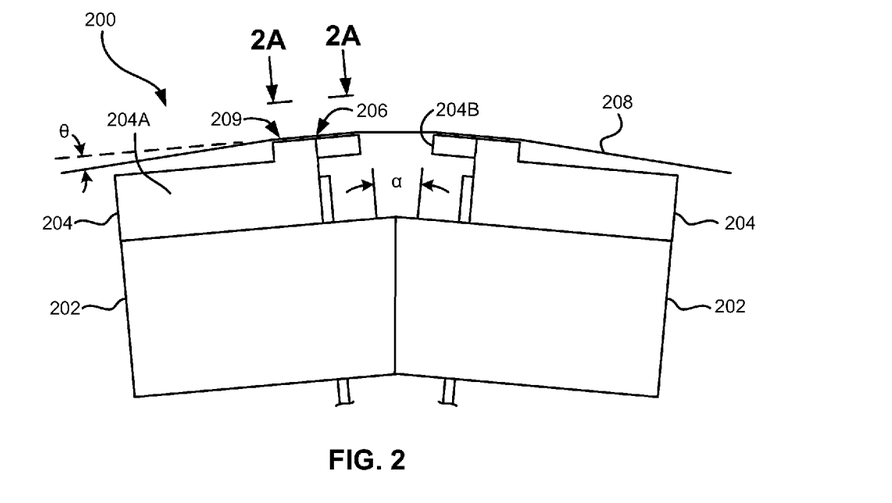
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 5 degrees.

The substrates 204A are typically constructed of a wear resistant material, such as a ceramic. The closures 204B made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2A:
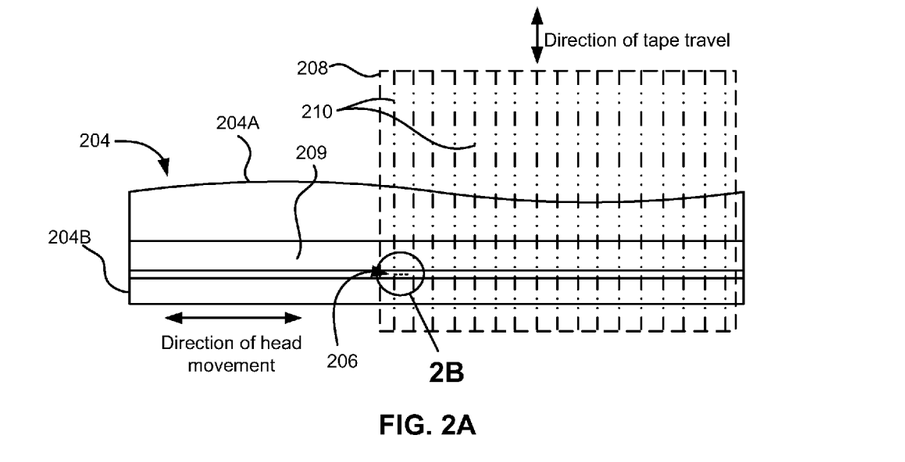
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 22 data bands, e.g., with 8 data bands and 9 servo tracks 210, as shown in FIG. 2A on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
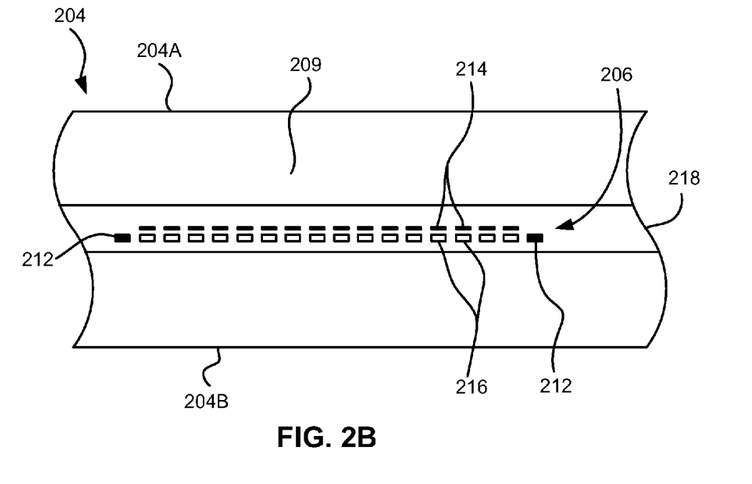
FIG. 2B is a detailed view taken from Circle 2B of FIG. 2A.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
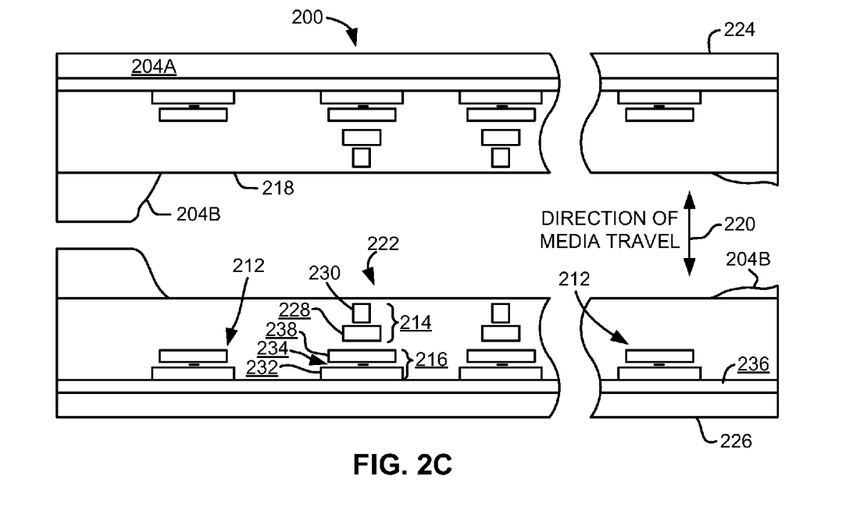
FIG. 2C is a detailed view of a partial tape bearing surface of a pair of modules.

FIG. 2C shows a partial tape bearing surface view of complimentary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write head 214 and the readers, exemplified by the read head 216, are aligned parallel to a direction of travel of a tape medium thereacross to form an R/W pair, exemplified by the R/W pair 222.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (-), CZT or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 3:
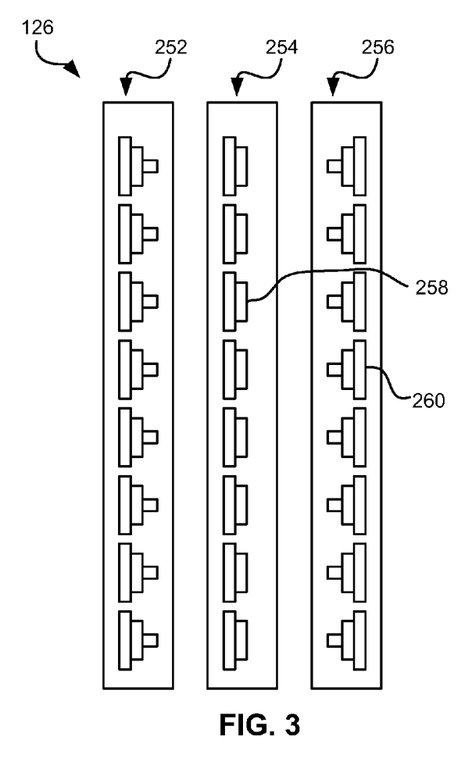
FIG. 3 is a partial tape bearing surface view of a magnetic head having a write-read-write configuration.
Figure 4:
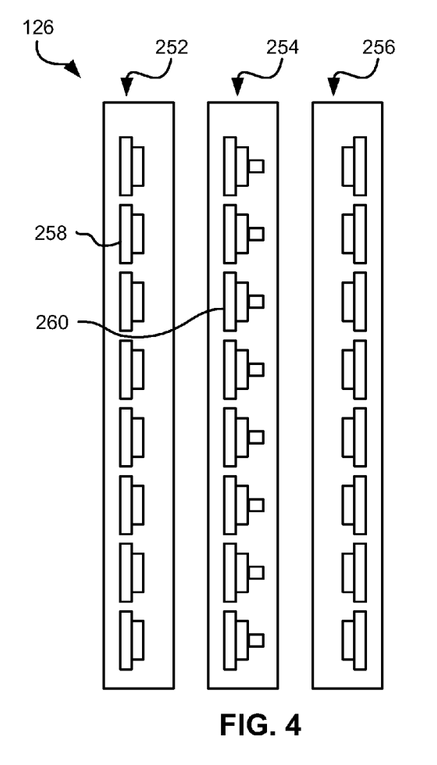
FIG. 4 is a partial tape bearing surface view of a magnetic head having a read-write-read configuration.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

One embodiment of a magnetic head includes first modules (referred to below as first, second and/or third modules) configured for writing and/or reading data to and from a tape in a first format and/or first generation and writing data, preferably with read-while-write verification, to the tape in a second format and/or second generation that is different than the first format and first generation. A supplemental module is coupled to the first modules, the supplemental module being configured for reading a tape having data written in the second format and/or the second generation.

Another embodiment of a magnetic head includes first modules configured for writing and read verifying data on a tape in accordance with a first generation and/or first format. At least one supplemental module is coupled to the first modules, the at least one supplemental module being configured for reading tape that was written, and preferably read verified, by a head having modules configured for a different generation (e.g., different track or linear densities) and/or different format (e.g., 4, 8, 16, etc. data bands) than the first generation and/or first format, where readers of the supplemental modules additionally have at least one of a lower average tape-to-sensor spacing (also known as head-to-media spacing or the like) in use than readers of the first modules, larger average data reader widths in the cross track direction than data readers of the first modules, and/or a greater shield-to-shield spacing than readers of the first modules. These parameters allow the readers on the supplemental module to read back data on the older generation tape with lower error rates than the readers on the modules.

Figure 5:
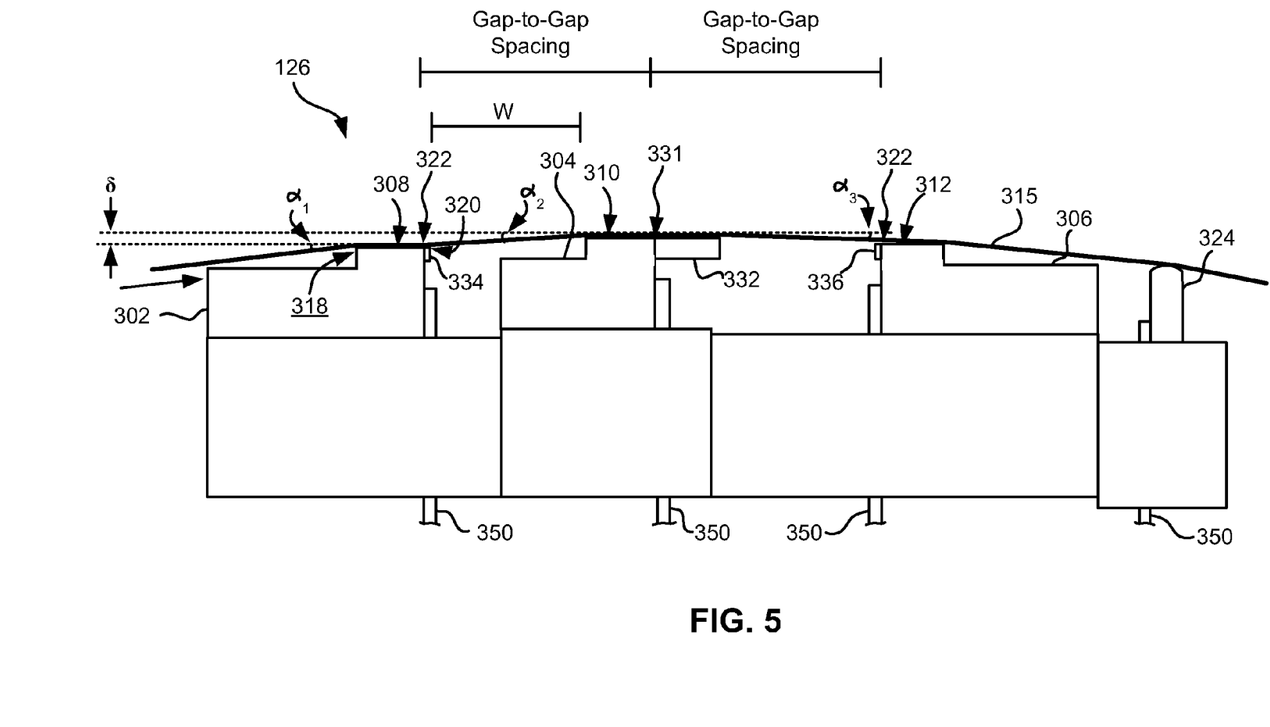
FIG. 5 is a side view of a magnetic tape head with three modules where the modules all generally lie along about parallel planes, and a supplemental module, according to one embodiment.

FIG. 5 illustrates a magnetic head 126 according to one embodiment of the present invention that includes first, second and third modules 302, 304, 306 each having a tape bearing surface 308, 310, 312 respectively, which may be flat, contoured, etc. (as in any of the embodiments described herein). The modules 302, 304, 306 may be configured for writing and/or reading data to and from a tape in a first format and/or first generation. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
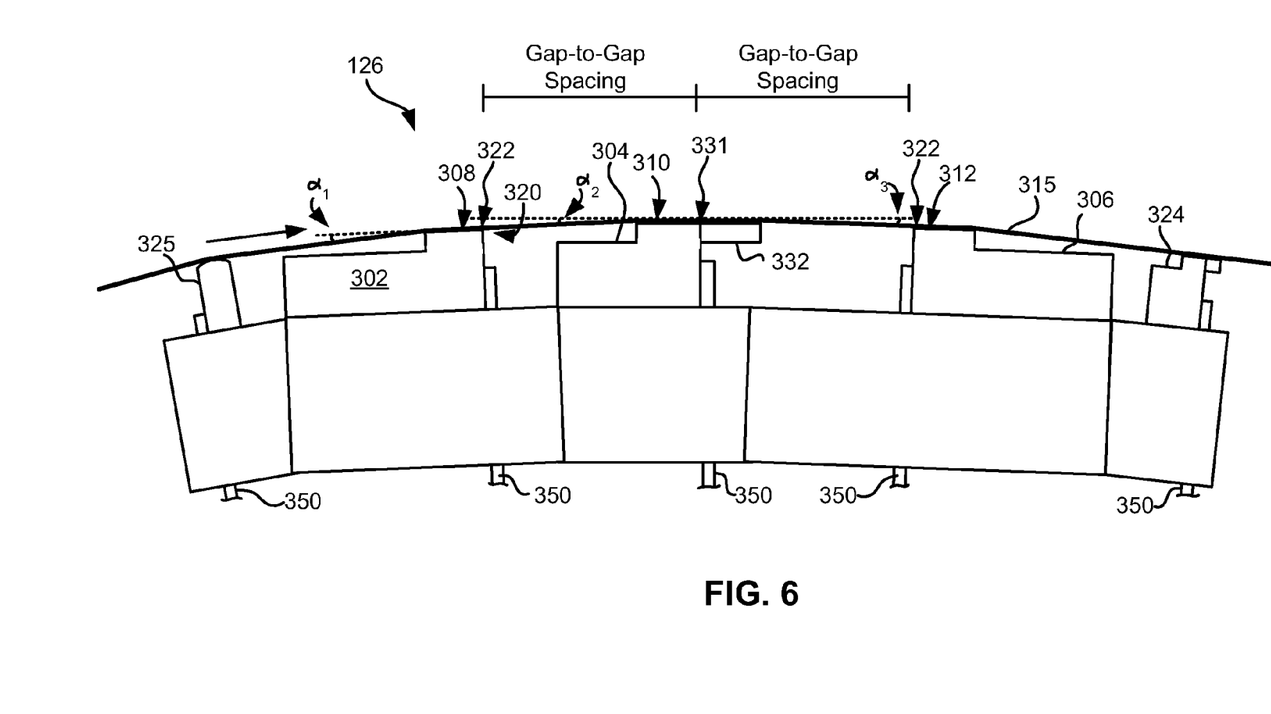
FIG. 6 is a side view of a magnetic tape head with three modules in a tangent (angled) configuration, and multiple supplemental modules, according to one embodiment.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_z$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_z$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_z$ is fixed when the modules 302, 304, 306 are coupled together or are otherwise fixed into a head. The inner wrap angle $\alpha_z$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.5° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 25-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than standard LTO tape head spacing. The open space between the modules 302, 304, 306 can still be set to approximately 0.5 to 0.6 mm, which in some embodiments is ideal for stabilizing tape motion over the second module 304.

The magnetic head 126 of FIG. 5 also includes a supplemental module 324, as will be explained in further detail below. In the example shown, the supplemental module 324 has an at least partially beveled tape bearing surface, as also described below. Moreover, the supplemental module 324 may be configured for reading a tape having data written in the second format and/or the second generation.

Depending on tape tension and stiffness, it may be desirable to angle the tape bearing surfaces of the outer modules relative to the tape bearing surface of the second module. FIG. 6 illustrates an embodiment where the modules 302, 304, 306, are in a tangent or nearly tangent (angled) configuration. Particularly, the tape bearing surfaces of the outer modules 302, 306 are about parallel to the tape at the desired wrap angle $\alpha_z$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

The embodiment 126 of FIG. 6 also includes multiple supplemental modules, including a first supplemental module 324 and a second supplemental module 325. As shown, the second supplemental module 325 is shown with an at least partially beveled tape bearing surface, while the first supplemental module 324 is shown with a planar tape bearing face. The first supplemental module 324 may be oriented in a tangent or nearly tangent (angled) configuration as shown, or may be overwrapped as in FIG. 7.

The second supplemental module 325 may be configured for reading a tape having data written in the first format and/or first generation, and/or a third format and/or third generation that is different than the first and second formats and the first and second generations. The second supplemental module 325, in another approach, is configured for reading a tape having data written in a second format having a lower data density than the first format. According to various approaches, the second supplemental module 325 may include any of the approaches described and/or suggested herein.

Typically, the tape wrap angles may be set about midway between the embodiments shown in FIGS. 5 and 6.

Figure 7:
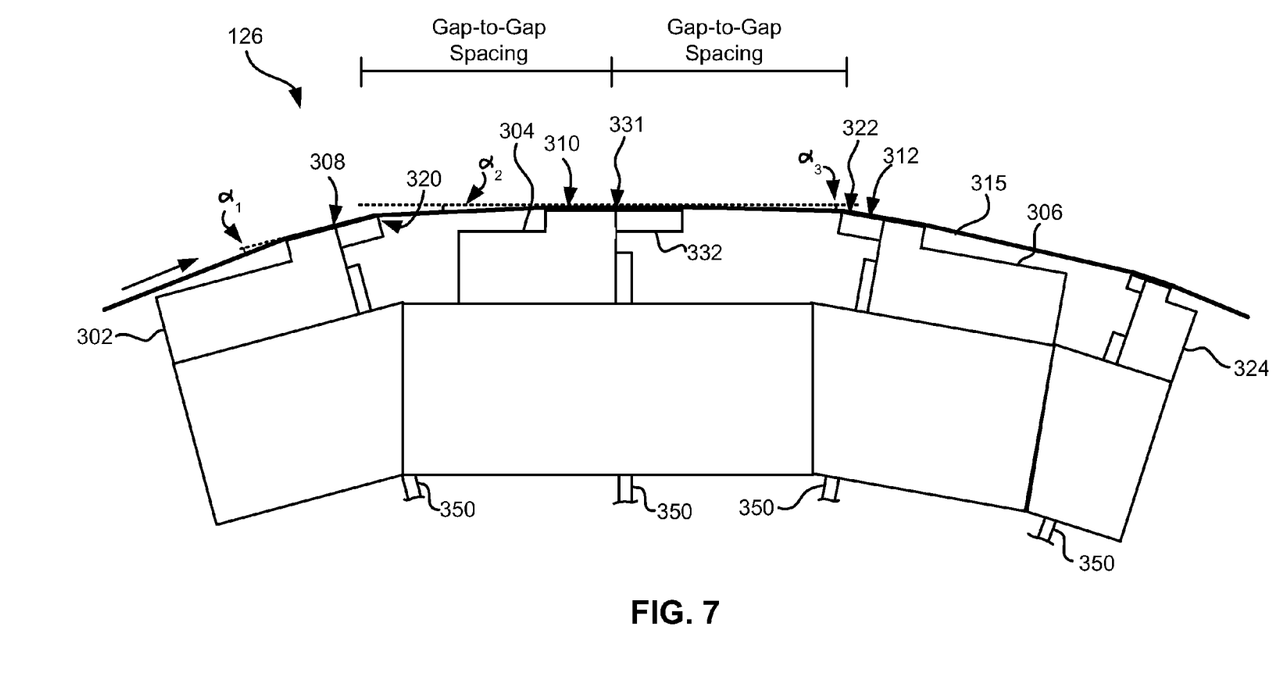
FIG. 7 is a side view of a magnetic tape head with three modules in an overwrap configuration, and a supplemental module, according to one embodiment.

FIG. 7 illustrates an embodiment where the modules 302, 304, 306 are in an overwrap configuration. Particularly, the tape bearing surfaces 308, 312 of the outer modules 302, 306 are angled slightly more than the tape 315 wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore a preferred embodiment has a write-read-write configuration, which may use shortened closures that thus allow closer gap-to-gap separation. A supplemental module 324 is also present.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous formats, including previous generations. In other approaches, the modules may be constructed as a unitary body. Those skilled in the art, armed with the present teachings, will appreciate that other known methods of manufacturing such heads may be adapted for use in constructing such heads.

When upgrading to a newer tape product format, such as a later generation, backward read compatibility is desirable for a magnetic head, e.g., the ability to read data on tapes having earlier formats. However, read elements in the newer format drives are generally narrower than the readers in the older format drives, e.g., to enable reduced track width and thus higher data capacity on tape. This may result in poorer error rates when reading older format media in the new drive, as the narrower new format read elements have poorer broadband signal-to-noise characteristics and are more sensitive to signal loss due to media defects.

As a result, conventional products must either either abandon backward compatibility, or alternatively add more read elements to the existing head modules, or alternatively limit areal density of the new format to enable some level of backward compatibility. However, by abandoning backward compatibility, conventional products are unable to access data written to tape in earlier formats. Moreover, by adding more read elements to the existing head modules increases the I/O on each module, thus making cabling more difficult in terms of size and flexibility.

Embodiments described and/or suggested herein preferably provide a head with readers that read a first format such as a newer format or one associated with a particular platform, as well as having additional backward and/or alternate-platform compatible readers, e.g., to read data on tapes having earlier/other formats and/or written on another platform that is incompatible with the first format. Moreover, this is ideally accomplished in a manner that does not compromise the head design for the first format.

According to exemplary embodiments, which are in no way intended to limit the invention, a magnetic head may include modules configured for writing and/or reading data to and from a tape in a first format. Such modules may include an array of readers, writers, or both, according to the first format, which may include any desirable configuration described herein. According to various approaches, the first format may be a later generation format (e.g., than a second format), a format associated with a particular standard or platform, a preferred format, etc.

Moreover, the magnetic head may also include a supplemental module coupled to the modules (see, e.g., 302, 304, 306, 324 and 325 of FIGS. 5-7). The supplemental module is preferably configured for reading a tape having data written in a second format, but is not limited thereto. Accordingly, the supplemental module may also include an array of readers, according to the second format, which is preferably a different configuration than that of the modules, as will soon become apparent.

The first format may have a higher data density than the second format in terms of average linear and/or average areal data density on tape, which can be measured, e.g., in bits per inch, bits per square inch, etc. Thus in one approach, it may be desirable that the widths of readers on the modules in a cross-track direction are narrower than widths of readers on the supplemental module. As a result, the narrower widths of the readers on the modules allow the modules to read data of a higher density than the readers on the supplemental module.

However, the wider widths of the readers on the supplemental module enables reduced signal to noise ratio (SNR) and improved error rates, etc. when reading data in an earlier format, e.g., which may have wider data tracks. Conversely, the larger widths of the readers on the supplemental module may also be wider than the actual data tracks of a given (e.g., newer) format, written to a tape. This may cause the readers on the supplemental module to cross over adjacent data tracks, thereby degrading SNR, read errors, etc.

As a result, in some approaches, the supplemental module may be incapable of reading data in the first format (e.g., a newer format), and/or incapable of reading data written and read verified by the modules. According to an example, which is in no way intended to limit the invention, the supplemental module may be able to read 8 data tracks per pass, while the first format may be written in 16 data tracks per pass. As a result, the 8 channels of the supplemental module may not align with the 16 data tracks, e.g., because of spacing between the data tracks, the size of the readers, the size of the data tracks, etc. Therefore, the supplemental module would not be able to read the data in the first format.

However, in yet another approach, widths of data readers on one or more of the modules in a cross-track direction may be wider than widths of readers on the supplemental module. Referring back to the examples presented directly above, the narrower widths of the readers on the supplemental module may allow for greater flexibility for readback, e.g., if the tape is distorted, environmental conditions have changed, etc., while also maintaining backward compatibility. In another approach, the narrower reader widths of the supplemental module allow a head to be usable with one format such as an older format, and also able to read a tape written in a newer format, such as a later generation. This also allows the data readers on the first modules to be more sensitive during read-while-write verification of the wider tracks written by the writers in the second format and/or generation, as well as allows them to read and/or write earlier generations and/or formats. When the tracks are shingled, the wider data readers of the first module(s) may be too wide to go back and effectively read the shingled tracks, and so the narrower data readers of the supplemental module may be used to readback of data on a tape written by the first modules in the second format and/or generation.

Accordingly, in one embodiment, the drive controller may be configured to write data in shingled tracks, where the data readers of the one or more of the first modules are wider than 50% of an average track width of the shingled tracks. In some approaches the data readers of the first modules may be wider than 50%, 75%, 90%, 100%, 125%, 150%, or more of the average track width of the shingled tracks.

In another approach, the supplemental module may include readers for reading the second format and a third format. While the third format may have a lower data density than the first format, according to different approaches, the third format may have a data density that is higher or lower than the second format. As described above, data density may be measured in terms of average linear and/or average bit density on tape, which can be measured, e.g., in bits per inch, bits per square inch, etc. Thus, according to a further approach, the number of readers on the supplemental module and/or their widths in a cross-track direction may be compatible with a second format and a third format. In different approaches, the supplemental module may be compatible with at least two formats (e.g., second and third format), at least four formats, multiple formats, etc., which may be older formats than a first format, as explained above. According to one approach, incorporating a second supplemental module may increase the number of formats a given magnetic head is compatible with, e.g., as shown illustratively in FIG. 6 and as explained in detail below.

In one approach, the readers for reading the second format and the third format may be arranged in two spatially separated arrays on the supplemental module, e.g., one above the other, aligned along a common longitudinal axis, etc. In another approach, the readers for reading more than one format, e.g., the second format and the third format, may be interleaved on the supplemental module e.g., as two interleaved arrays. According to an illustrative example, which is in no way intended to limit the invention, a 32 channel head may have backward compatibility to 16 channel formatted tapes. In this case, alternating readers of the 32 channel formatted head may have alternating widths. Thus, the 32 channel formatted head may be able to read data of a second format, e.g., 32 data tracks with a given average width and spacing therebetween, while also being able to read data written in a third format, e.g., 16 data tracks with a different average width and spacing therebetween.

In one illustrative embodiment, the supplemental module may be built with 32 channels and 4 servo readers. Depending on the application, two of the servo readers may be used when reading data in a 32 channel format, while the other two servo readers may be used when reading data in a 16 channel format, but is not limited thereto. Additionally, the servo readers and/or data readers on the supplemental module may be used for band detection and/or skew control for one or more of the data formats.

In one approach, the supplemental module may have an at least partially beveled tape bearing surface that is truly beveled, partially rounded, and/or otherwise not flat across the entire tape-facing surface, e.g., as shown in FIGS. 5 and 6). Having an at least partially beveled tape bearing surface on the supplemental module may be desirable depending on the embodiment, as it may reduce the friction between the tape and the tape bearing surface of the supplemental module.

In another approach, the supplemental module may set a tape wrap angle relative to one of the modules positioned immediately adjacent thereto. The supplemental module may set a tape wrap angle e.g., by its positioning relative to the nearest module. An illustrative wrap angle range is less than about 3°, preferably less than about 2°.

In one approach, the supplemental module may be oriented in a tangent or slightly overwrapped orientation relative to the direction of tape travel, thereby enabling bi-directional operation. See, e.g., FIG. 6.

In another approach, the supplemental module may be positioned so that a tape wraps both tape-engaging edges of the supplemental module, thereby also enabling bi-directional operation. Thus, according to one approach, the supplemental module may read data from the tape in both directions of tape travel. See, e.g., FIG. 7.

In another approach, the magnetic head may include a second supplemental module coupled to the modules and/or the supplemental module. In one approach, the supplemental module may be positioned on an opposite side of the modules than the second supplemental module in a tape travel direction, e.g., as shown in FIG. 6. However, in other approaches, the supplemental module may be coupled to the modules on the same side of the modules as the second supplemental module, coupled to the second supplemental module itself, etc., or any other desirable position.

The second supplemental module may preferably be configured for reading a tape having data written in a third format, such as one having a lower data density than the second format and/or from a different platform. However, in still another approach, the supplemental module and the second supplemental module may be configured for reading data written in the same format, e.g., for bi-directional read operation. According to various approaches, the second supplemental module may be positioned according to any of the approaches described above for the supplemental module. Moreover, the supplemental module and the second supplemental module may have the same or different positioning relative to the modules and/or tape path, depending on the desired embodiment.

Figure 8:
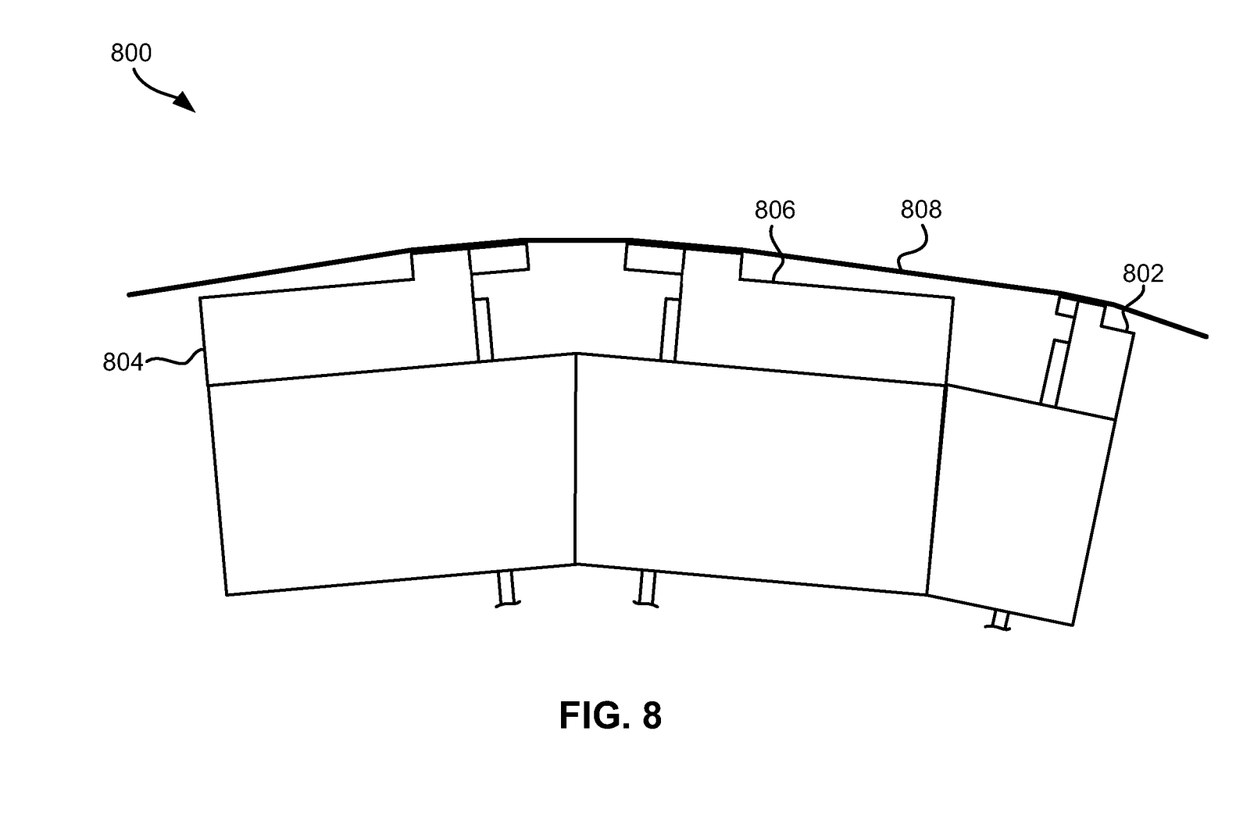
FIG. 8 is a side view of a magnetic tape head with two modules, and a supplemental module, according to one embodiment.

According to another exemplary embodiment, a data storage system may include a magnetic head having modules configured for writing and/or reading data to and from a tape in a first format (see 302, 304 and 306 of FIGS. 5-7, and 804 and 806 of FIG. 8). According to various approaches, the modules may include any modules described and/or suggested herein.

The data storage system may also include a supplemental module coupled to the modules (see 324, 325 of FIGS. 5-7 and 802 of FIG. 8), the supplemental module being configured for reading a tape having data written in the first format. However, it may be preferable that the supplemental module is not used for reading unless one of the modules for reading data becomes at least partially inoperative, e.g., unable to reliably reproduce data because one of the readers has failed or otherwise rendered at least partially inoperative, etc. Thus, the supplemental module may be used as a back-up so that the magnetic head may still be used in read-only mode. In one approach, when the at least one of the modules becomes at least partially inoperative, a signal may be sent to a user administrator which may notify a user. In another approach, when the at least one of the modules becomes at least partially inoperative, the supplemental module may be employed by using e.g., computer program code, logic, etc., which may be stored in a system manager, controller, user interface, etc.

The supplemental module is preferably characterized by fabrication separately from the modules, and thus has physical characteristics of such separate fabrication such as marks from dicing, different thin film construction than the modules, etc. The supplemental module may be permanently coupled to one or more of the modules, or a support thereof, e.g., via an adhesive, sonic welding, fasteners, clips, etc.

Although three modules 302, 304, 306 are illustrated in combination with the supplemental module(s) 324, 325 in FIGS. 5-7, in other approaches, a magnetic head may include any number of modules e.g., at least one, two, at least two, at least three, a plurality, etc. depending on the desired embodiment. Moreover, the modules may be positioned with any orientation relative to each other and/or the supplemental modules of the magnetic head, depending on the desired embodiment.

FIG. 8 depicts a magnetic head 800, in accordance with one embodiment. As an option, the present magnetic head 800 may be implemented in conjunction with features from any other embodiment listed herein, such as those described with reference to the other FIGS. Of course, however, such magnetic head 800 and others presented herein may be used in various applications and/or in permutations which may or may not be specifically described in the illustrative embodiments listed herein. Further, the magnetic head 800 presented herein may be used in any desired environment.

As illustrated in FIG. 8, the magnetic head 800 includes a supplemental module 802 coupled to the modules 804, 806, over which a magnetic tape 808 may run. According to various approaches, the magnetic head 800, supplemental module 802 and/or the modules 804, 806 may include any of the approaches described and/or suggested herein, depending on the desired embodiment. Thus, although not illustrated, the magnetic head 800 may include a second supplemental module coupled to the modules 804, 806 and/or supplemental module 802 according to any of the approaches described and/or suggested herein, depending on the desired embodiment.

According to various embodiments, a data storage system may include a magnetic head having modules configured for writing and/or reading data to and from a tape in a first format (see e.g., 302, 304 and 306 of FIGS. 5-7, and 804 and 806 of FIG. 8). According to various approaches, the modules may include any modules described and/or suggested herein. The data storage system may also include one or more supplemental modules (see, e.g., 324 of FIGS. 5-7 and 802 of FIG. 8) of any type, configuration, position, etc. as described or suggested herein, in any combination. Thus, for example, the embodiment shown in FIG. 6 may instead have one or two supplemental modules configured in an overwrap configuration, and thus FIG. 6 (and the other FIGS.) should be deemed to include any and all possible permutations.

Figure 9:
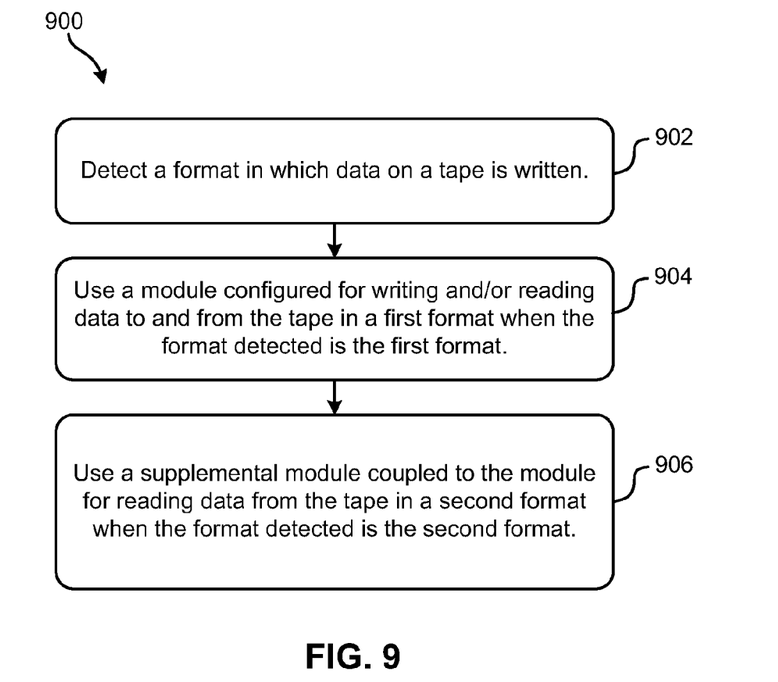
FIG. 9 is a flowchart for a method according to one embodiment.

FIG. 9 depicts a method 900, in accordance with one embodiment. As an option, the present method 900 may be implemented in conjunction with features from any other embodiment listed herein, such as those described with reference to the other FIGS. Of course, however, such method 900 and others presented herein may be used in various applications and/or in permutations which may or may not be specifically described in the illustrative embodiments listed herein. Further, the method 900 presented herein may be used in any desired environment.

The method 900 includes detecting a format in which data on a tape is written. See operation 902. According to various approaches, the format may be detected by reading the format from cartridge memory, by reading headers on the tape, by reading a portion of the data, by receiving an instruction from another machine such as a library controller, etc.

With continued reference to FIG. 9, operation 904 of method 900 includes using one or more modules configured for writing and/or reading data to and from the tape in a first format when the format detected is the first format. As described above, the first format may be an earlier or later generation format (e.g., than the second format), a format associated with a particular standard or platform, a preferred format, etc.

Method 900 additionally includes using a supplemental module coupled to the module(s) for reading data from the tape in a second format when the format detected is the second format, where, for example, the first format has a higher data density than the second format, e.g., for backward compatibility. See operation 906. In an alternate embodiment, the supplemental module may be used for reading a newer format, as described by way of example below. Again, as described above, the data density may be in terms of average linear and/or average areal data density on tape, which can be measured, e.g., in bits per inch, bits per square inch, etc.

According to various approaches, the supplemental module may be used immediately when the second format is detected, after a period of time once the second format is detected, etc. With continued reference to the present description, the supplemental module may be "used" by turning on the readers within the supplemental module, but is not limited thereto. Moreover, once the supplemental module has been employed, the readers in the modules corresponding to the first format may be turned off, set to an idle state, etc., according to different approaches.

In one embodiment, the second format may be the same as the first format. In an approach where the widths of the readers used to read verify tracks being written in a shingled writing mode are too wide to read the shingled tracks, e.g., in the first format, the readers of the supplemental module may be narrow enough to read the shingled tracks. Thus, the supplemental module may be used as the primary reader for readback of the shingled tracks in the first format. While the wider readers that were used to read-verify the first format cannot read the shingled tracks, they may be usable to read and/or write tape in an earlier format, e.g., the second format. This approach is counterintuitive, but is very useful in enabling both narrow shingled track widths while also enabling backward read and write compatibility. Thus, an embodiment may include features similar to those of FIG. 9 in conjunction with the precepts of this paragraph.

Figure 10:
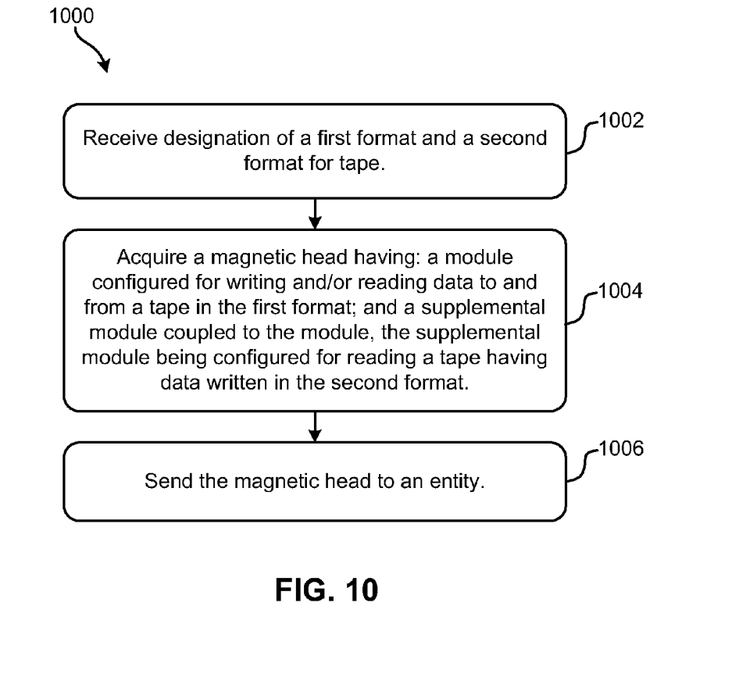
FIG. 10 is a flowchart for a method according to one embodiment.

With reference now to FIG. 10, a method 1000, is depicted in accordance with one embodiment. As an option, the present method 1000 may be implemented in conjunction with features from any other embodiment listed herein, such as those described with reference to the other FIGS. Of course, however, such method 1000 and others presented herein may be used in various applications and/or in permutations which may or may not be specifically described in the illustrative embodiments listed herein. Further, the method 1000 presented herein may be used in any desired environment.

Operation 1002 of method 1000 includes receiving designation of a first format and a second format for tape. In a preferred approach, the first format has a higher data density than the second format in terms of average linear and/or average areal data density on tape, which can be measured, e.g., in bits per inch, bits per square inch, etc.

In one approach, the designation of the first and/or second formats may be received from a user, but is not limited thereto. In other approaches, the designation of the first and/or second formats may be received from computer program code, logic, a lookup table, etc.

With continued reference to FIG. 10, method 1000 includes acquiring a magnetic head having: one or more modules configured for writing and/or reading data to and from a tape in the first format and/or first generation; and a supplemental module coupled to the module(s), the supplemental module being configured for reading a tape having data written in the first format and/or first generation, and/or a second format and/or a second generation. See operation 1004.

Additionally, operation 1006 of method 1000 includes sending the magnetic head to an entity such as a user, company, etc. However, according to an alternative approach, the method 1000 may include coupling the head to a magnetic storage system, wherein the magnetic storage system is sent to the user.

Moreover, a magnetic head having one or more supplemental modules may be tailored for a particular user, client, system, etc., depending on the desired embodiment. Each data format may have a respective supplemental module, which would preferably offer reader compatibility to any earlier and/or other format. According to an exemplary embodiment, which is in no way intended to limit the invention, a user operating on an earlier format who wishes to upgrade to the latest format would implement a head compatible with the latest format and a supplemental module compatible with the earlier format. Thus, the user's system may be upgraded to the latest format, while maintaining the ability to read the data previously recorded using the earlier format. Moreover, according to one approach, the latest formatted head may have read compatibility back to an ever earlier format. In another approach, formats may be grouped together, e.g., so as to use a common supplemental module. For example, which is in no way intended to limit the invention, both Linear Tape Open (LTO)1 and LTO2 formatted customers may be able to use a LTO2 formatted supplemental module. Similarly, both LTO3 and LTO4 formatted customers may be able to use a LTO4 formatted supplemental module. This may be desirable as it may simplify part numbers and format configurations.

Moreover, any increase in mass of the overall magnetic head caused by the inclusion of the at least one supplemental module may be offset by trimming the supports, e.g., U-beams of the modules and/or by using lower density material e.g., for the U-beams.

It will be clear that the various features of the foregoing systems and/or methodologies may be combined in any way, creating a plurality of combinations from the descriptions presented above.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electro-magnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (e.g., CD-ROM), a Blu-ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fibre, etc.

Program code embodied on a computer readable medium may be transmitted using any appropriate medium, including but not limited to wireless, wireline, optical fibre cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer, for example through the Internet using an Internet Service Provider (ISP).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart(s) and/or block diagram block or blocks.

It will be further appreciated that embodiments of the present invention may be provided in the form of a service deployed on behalf of a customer.

While various embodiments have been described above, it should be understood that they have been presented by way of example only, and not limitation.

Thus, the breadth and scope of an embodiment of the present invention should not be limited by any of the above-described exemplary embodiments, but should be defined only in accordance with the following claims and their equivalents.

What is claimed is:

1. A method, comprising:
   detecting a format in which data on a tape is written;
   using a module configured for writing and/or reading data to and from the tape in a first format when the format detected is the first format; and
   using a supplemental module coupled to the module for reading data from the tape in a second format when the format detected is the second format,
   wherein the first format has a higher data density than the second format.

2. A method, comprising:
   receiving designation of at least a first format and/or first generation for tape;
   acquiring a magnetic head having:
      a module configured for writing and/or reading data to and from a tape in the first format and/or first generation; and
      a supplemental module coupled to the module, the supplemental module being configured for reading a tape having data written in the first format and/or first generation, and/or a second format and/or a second generation; and
   sending the magnetic head to an entity.

3. A method as recited in claim 2, further comprising coupling the head to a magnetic storage system, wherein the magnetic storage system is sent to the user.

4. A method as recited in claim 2, wherein the designation of the first and second formats is received from the user.

5. A method as recited in claim 2, wherein the first format has a higher data density than the second format.

* * * * *